Sept. 10, 1935.  W. GROSS  2,013,984
PROCESS FOR THE OXIDATION OF NITRITES TO NITRATES
Filed June 8, 1931
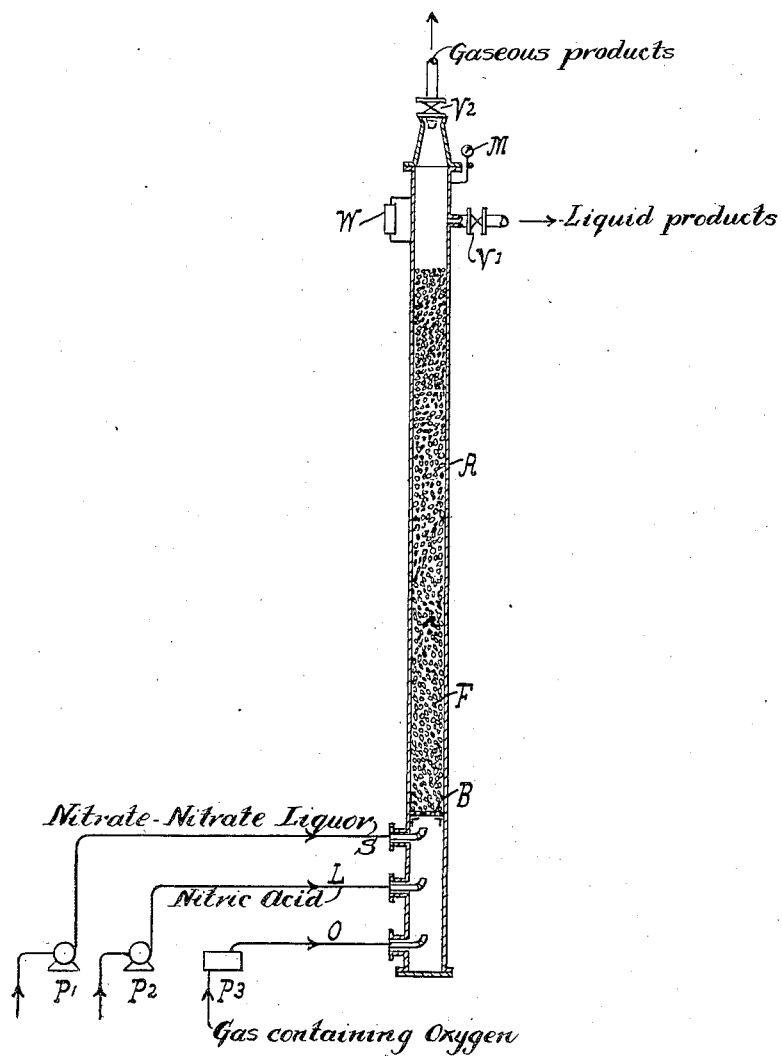
INVENTOR
Walter Gross
BY his ATTORNEYS Patented Sept. 10, 1935

2,013,984

UNITED STATES PATENT OFFICE 2,013,984

PROCESS FOR THE OXIDATION OF NITRITES TO NITRATES

Walter Gross, Neuroessen, Germany, assignor to I. G. Farbenindustrie Aktiengesellschaft, Frankfort-on-the-Main, Germany Application June 8, 1931, Serial No. 542,914
In Germany June 11, 1930

5 Claims. (Cl. 23—102)

The present invention relates to an improved process for the oxidation of nitrites to nitrates.

In the production of nitric acid by the oxidation of ammonia or nitrogen, the last traces of oxides of nitrogen in the gases are usually recovered by absorption in soda solutions, a liquor being obtained which contains sodium nitrite and sodium nitrate. Either the nitrite as well as the nitrate are separately recovered from this liquor, or the nitrite is converted into nitrate by treatment with nitric acid. The nitrogen oxides thus set free are returned to the absorption plant. A certain part of it produces further amounts of nitrite and nitrate in the alkaline absorption liquid.

If the oxides of nitrogen are to be combined in the form of calcium nitrate, the last traces of the oxides of nitrogen are preferably absorbed in milk of lime instead of in alkalies. The liquor containing calcium nitrite and calcium nitrate thus obtained which also contains calcium carbonate in suspension, necessitates lengthy and troublesome operations to convert the nitrite into nitrate. The calcium carbonate must first be separated, because otherwise when treated with nitric acid carbon dioxide would be set free in addition to the oxides of nitrogen. When these gases are returned to the absorption plant again, calcium carbonate is again formed and thus carbon dioxide becomes enriched in this system.

I have now found that the conversion of nitrites into the corresponding nitrates by oxidation in aqueous solution by means of nitric acid and oxygen or gases containing oxygen is carried out in a very advantageous manner industrially by producing an intimate mixture of the solution containing nitrite with the nitric acid and oxygen or gases containing oxygen in the lower part of a vertical tube, the mixture then being allowed to ascend in the tube, the height of which is so chosen as to effect the complete conversion, and the separation of the liquid from the gas then being effected at the upper end of the tube. By working in this manner, advantageously under elevated pressure, the oxides of nitrogen formed from the nitrite are completely combined as nitrate in a continuous operation. The gases leaving the reaction tower consist of excess oxygen which is mixed with nitrogen, when air is used as the gas containing oxygen, and carbon dioxide when carbonates are present in the initial material. By this method, however, no gas is obtained which must be supplied again to the absorption stage, and this entails a great saving in absorption plant.

The present invention offers special advantages with nitrite-nitrate solutions containing carbonates such as are obtained, for example, by the absorption of oxides of nitrogen with milk of lime, because the carbon dioxide set free by the nitric acid causes no trouble but is removed from the process together with the waste gases free from oxides of nitrogen. When employing milk of lime as the absorption agent, the reaction proceeds smoothly in accordance with the equation $Ca(NO_2)_2 + O_2 = Ca(NO_3)_2$.

The present invention therefore allows of a direct conversion of nitrites to nitrates in a simple manner. The apparatus of large dimensions hitherto necessary, especially when working up liquors containing calcium carbonate, for filtering the liquors and washing and removing the sludge are dispensed with. The costs of the evaporation of the washing water are saved and the loss of nitrogen compounds by reason of the residual sludge is avoided.

The nature of the invention will be further described with reference to the accompanying drawing which illustrates apparatus suitable for carrying out the invention but the invention is not restricted to the particular apparatus shown.

The nitrite-nitrate liquor, nitric acid and oxygen or gases containing oxygen are forced through pipes S, L and O, respectively by pumps or blowers $P_1$, $P_2$ and $P_3$ into a pressure tight tube A of acid-resistant material below a grate B. The space above the grate B is provided with fillers F almost to the top. The liquid leaves the reaction chamber through a valve $V_1$ and the gas through a valve $V_2$. The valves are regulated so that a certain pressure (indicated on the manometer M) always prevails in the apparatus, care being taken by using an observation glass W that the liquid keeps a constant level in the tube and the gas space above the liquid is as small as possible.

The fillers F may be dispensed with and the gas dispersed by sieves arranged one above another.

The following examples will further illustrate the nature of the invention as applied to an apparatus such as that shown in the accompanying drawing, but the invention is not restricted to these examples.

The oxygen content of the oxidizing gases, the pressure employed and the dimensions of the tube are not restricted to those specified in the examples but depend in each case on the composition of the liquors and the nature of the gases containing oxygen available. Thus, as shown in Example 3, the time of reaction may be increased by lengthening the reaction tube and reducing the throughput that the oxidation of the nitrite proceeds smoothly even when employing air.

Example 1

500 liters of calcium nitrite-calcium nitrate sludge containing 3.8 per cent of nitrite nitrogen and 3 per cent of calcium carbonate, 250 liters of 60 per cent (by volume) nitric acid and 19 cubic meters of a mixture of oxygen and nitrogen containing 87 per cent of oxygen are pumped or blown per hour into the lower part of a tube 6 meters long and 100 millimeters in diameter. The gases are released from a pressure of 7 atmospheres to atmospheric pressure at the upper end of the tube. The nitrite in the solution is converted into nitrate to the extent of 99.4 per cent.

Example 2

100 liters of calcium nitrate-calcium nitrite sludge containing 3.8 per cent of nitrite nitrogen and 3 per cent of calcium carbonate, 50 liters of 60 per cent (by volume) nitric acid and 10 cubic meters of a mixture of oxygen and nitrogen containing 50 per cent of oxygen are led per hour through the tube described in Example 1. With a pressure of 8 atmospheres, 99.9 per cent of the nitrite is converted into nitrate.

Example 3

90 liters of calcium nitrate-calcium nitrite sludge containing 4 per cent of nitrite nitrogen and 3.5 per cent of calcium carbonate, 100 liters of 60 per cent (by volume) nitric acid and 25 cubic meters of air are passed hourly into a tube 10 meters in length and 100 millimeters in diameter. With a pressure of 3.6 atmospheres, 98 per cent of the nitrite are converted into nitrate.

Example 4

100 liters of an aqueous solution containing 6 per cent of sodium nitrate, 3 per cent of sodium nitrite and 2 per cent of sodium carbonate, together with 20 liters of 60 per cent (by volume) of nitric acid and 2 cubic meters of a mixture of equal volumes of oxygen and nitrogen are passed per hour through a tube 10 meters long and 100 millimeters in diameter. When a pressure of 8 atmospheres is maintained, 99.9 per cent of the nitrite are converted into nitrate.

The process according to the present invention is applied in a similar manner to the oxidation of other nitrites, in particular those of the alkali metals and alkaline earth metals.

What I claim is:

1. The process for the oxidation of a nitrite to the corresponding nitrate which comprises supplying a solution of the nitrite, nitric acid and a gas comprising elementary oxygen to the lower end of a column of aqueous liquid and separately withdrawing gas and liquid at the upper end of said column, said column being of sufficient length to effect substantially complete oxidation of the nitrite and to produce a gas substantially free from oxides of nitrogen.

2. The process for the oxidation of calcium nitrite to calcium nitrate which comprises supplying a solution of the nitrite, nitric acid and a gas comprising elementary oxygen to the lower end of a column of aqueous liquid and separately withdrawing gas and liquid at the upper end of said column, said column being of sufficient length to effect substantially complete oxidation of the nitrite and to produce a gas substantially free from oxides of nitrogen.

3. The process for the oxidation of calcium nitrite to calcium nitrate which comprises supplying a solution of the nitrite containing calcium nitrate and calcium carbonate, nitric acid and a gas comprising elementary oxygen to the lower end of a column of aqueous liquid and separately withdrawing gas and liquid at the upper end of said column, said column being of sufficient length to effect substantially complete oxidation of the nitrite and to produce a gas substantially free from oxides of nitrogen.

4. The process for the oxidation of sodium nitrite to sodium nitrate which comprises supplying a solution of the nitrite, nitric acid and a gas comprising elementary oxygen to the lower end of a column of aqueous liquid and separately withdrawing gas and liquid at the upper end of said column, said column being of sufficient length to effect substantially complete oxidation of the nitrite and to produce a gas substantially free from oxides of nitrogen.

5. The process for the oxidation of sodium nitrite to sodium nitrate which comprises supplying a solution of the nitrite containing sodium nitrate and sodium carbonate, nitric acid and a gas comprising elementary oxygen to the lower end of a column of aqueous liquid and separately withdrawing gas and liquid at the upper end of said column, said column being of sufficient length to effect substantially complete oxidation of the nitrite and to produce a gas substantially free from oxides of nitrogen.

WALTER GROSS.